US012711155B1

(12) United States Patent
Ranjan et al.

(10) Patent No.: US 12,711,155 B1
(45) Date of Patent: Aug. 18, 2026

(54) SYSTEM AND METHODS TO GENERATE SYNTHETIC DATA FOR NETWORK USING GENERATIVE ADVERSARIAL NETWORK

(71) Applicant: T-MOBILE INNOVATIONS LLC, Overland Park, KS (US)

(72) Inventors: Vikas Ranjan, Bellevue, WA (US); Monte William Cox, Kewaskum, WI (US); Stephen Mcarthur Flanagan, Jr., Lenexa, KS (US); Shayam Parthasarathy, Bellevue, WA (US); Shomik Bhattacharya, Celina, TX (US); Manjith Bahuleyan, Bothell, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 0 days.

(21) Appl. No.: 19/174,048

(22) Filed: Apr. 9, 2025

(51) Int. Cl.
*G06F 16/00* (2019.01)
*G06F 16/28* (2019.01)

(52) U.S. Cl.
CPC .................................. *G06F 16/285* (2019.01)

(58) Field of Classification Search
CPC ..................................................... G06F 16/285
See application file for complete search history.

(56) References Cited

U.S. PATENT DOCUMENTS 11,475,276 B1 * 10/2022 Shrivastava ........... G06N 3/045
11,615,290 B2 * 3/2023 Kim ....................... G06N 3/047 706/25
11,675,921 B2 * 6/2023 Arthur ................... G06N 3/047 726/26
12,073,246 B2 * 8/2024 Chandrasekaran ..... G06F 16/88
2023/0409607 A1 * 12/2023 Pratik .................... G06N 3/094
2025/0139500 A1 * 5/2025 Ma ......................... G06N 20/00
2025/0252156 A1 * 8/2025 Chung ................ G06F 21/6254

OTHER PUBLICATIONS

Etlinger, Susan. 6 insights to make your data AI-ready, with Accenture's Teresa Tung. Nov. 7, 2024, https://azure.microsoft.com/en-us/blog/6-insights-to-make-your-data-ai-ready-with-accentures-teresa-tung/. Accessed Nov. 18, 2024. 4 pages.

* cited by examiner

*Primary Examiner* — Noosha Arjomandi
(74) *Attorney, Agent, or Firm* — SHOOK, HARDY & BACON L.L.P.

(57) ABSTRACT

A generator model initially receives seed data for a telecommunications network. Using the seed data, the generator model generates, in one or more simulations cycles, synthetic data. A discriminator model, trained to classify the synthetic data, communicates the classified data to the generator to update the generator model. An evaluator evaluates the synthetic data that has been combined with the seed data using evaluation metrics. In various aspects, the generator model: extracts semantic information from text embeddings of the seed data; extracts feature data from the semantic information; determines a relationship between the feature data and the semantic information; and disentangles the feature data to generate the synthetic data. In some aspects, the generator model adds noise at the generator to vary the feature data prior to each simulation cycle of the one or more simulation cycles.

20 Claims, 4 Drawing Sheets

SYSTEM AND METHODS TO GENERATE SYNTHETIC DATA FOR NETWORK USING GENERATIVE ADVERSARIAL NETWORK

SUMMARY

The present disclosure is directed, in part to provisioning wireless priority service privileges, substantially as shown and/or described in connection with at least one of the figures, and as set forth more completely in the claims.

According to various aspects of the technology, a generative adversarial network is leveraged to generate synthetic data for a telecommunications network. In aspects, a generator model and a discriminator model (based on a neural network) operate as adversaries to ensure synthetic data is generated that meets or exceeds a threshold. The synthetic data can be communicated to various applications to deploy new or additional services to the network.

To do so, a generator model initially receives seed data for a telecommunications network. Using the seed data, the generator model generates, in one or more simulations cycles, synthetic data. A discriminator model, trained to classify the synthetic data, communicates the classified data to the generator to update the generator model. An evaluator evaluates the synthetic data that has been combined with the seed data using evaluation metrics.

In various aspects, the generator model: extracts semantic information from text embeddings of the seed data; extracts feature data from the semantic information; determines a relationship between the feature data and the semantic information; and disentangles the feature data to generate the synthetic data. In some aspects, the generator model adds noise at the generator to vary the feature data prior to each simulation cycle of the one or more simulation cycles.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

DETAILED DESCRIPTION

Figure 1:
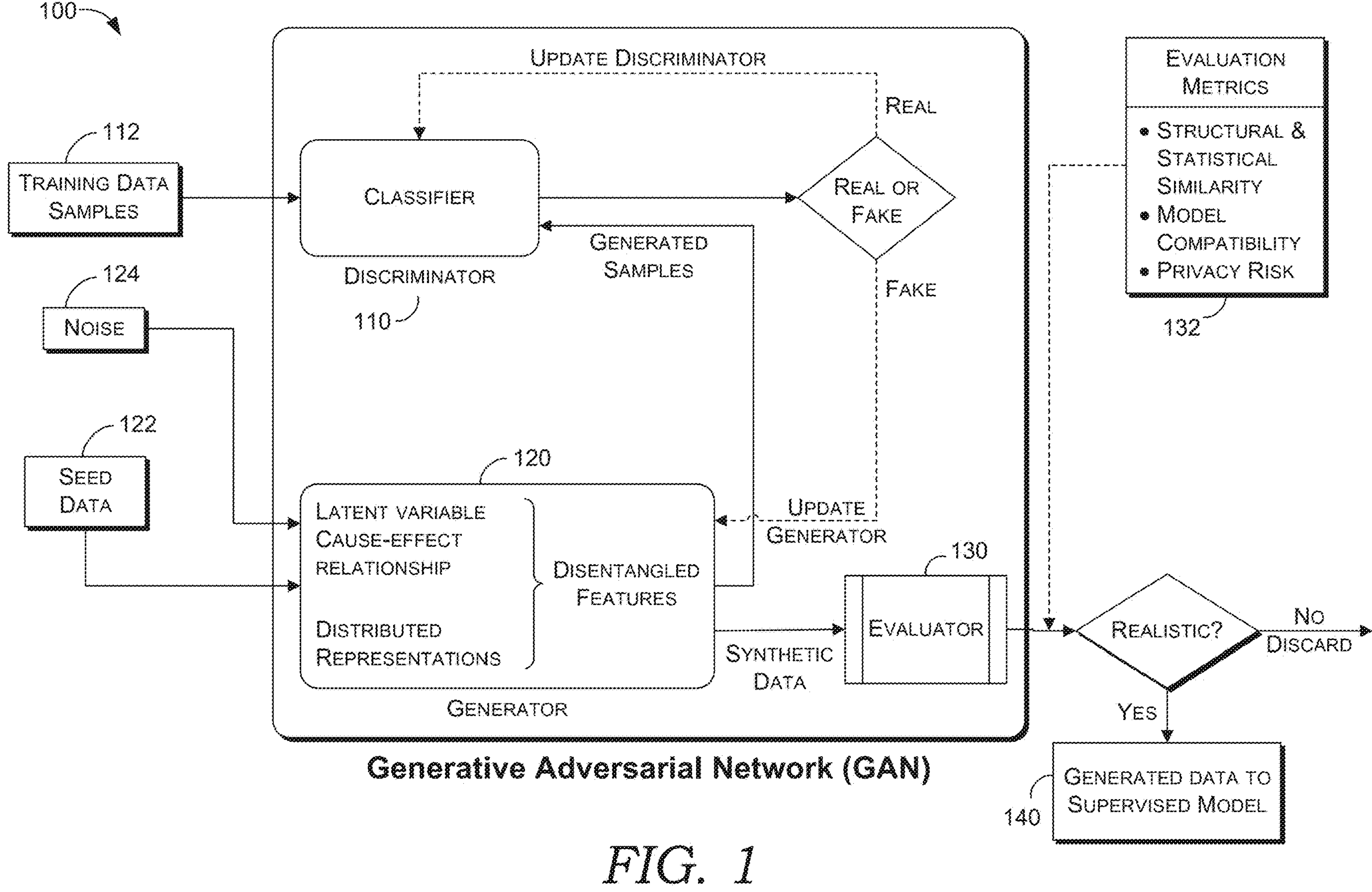
FIG. 1 illustrates a diagram of an exemplary network environment in which implementations of the present disclosure may be employed.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various technical terms, acronyms, and shorthand notations are employed to describe, refer to, and/or aid the understanding of certain concepts pertaining to the present disclosure. Unless otherwise noted, said terms should be understood in the manner they would be used by one with ordinary skill in the telecommunication arts. An illustrative resource that defines these terms can be found in Newton's Telecom Dictionary, (e.g., 32d Edition, 2022). As used herein, the term "base station" refers to a centralized component or system of components that is configured to wirelessly communicate (receive and/or transmit signals) with a plurality of stations (i.e., wireless communication devices, also referred to herein as user equipment (UE(s))) in a particular geographic area. As used herein, the term "network access technology (NAT)" is synonymous with wireless communication protocol and is an umbrella term used to refer to the particular technological standard/protocol that governs the communication between a UE and a base station; examples of network access technologies include 3G, 4G, 5G, 6G, 802.11x, and the like.

By way of background, telecommunications networks are evolving rapidly and deploying new services on the network to provide better experience for customers (e.g., consumers and enterprises). In one example, 5G standalone (SA) infrastructure may be deployed in a new market. In another example, network slicing may be deployed to provide distinct virtual network slices on top of a shared 5G architecture and enables each slice to have its own characteristics, logical topology, and security rules to optimize network performance for specific use cases. In another example, advanced network services (ANS) may be deployed to enable customers to unlock massive amounts of data using 5G connectivity with edge computing. In another example, existing services (e.g. rich communication services) may be upgraded or a core node may be migrated to a containerized platform. In another example, new features or configurations may be added to a UE (e.g., causing the UE to prioritize 5G over 4G in particular geographical area).

In each of the examples above, data is needed for performance analytics to predict or forecast if the new features, modifications, etc. will cause degradation of services. Conventionally, these changes are implemented on a small scale and the resulting datasets are very small. In many cases, data corresponding to the new features, modifications, etc. is not even available. Moreover, as the changes are implemented, variables change from area to area and meaningful KPIs cannot be developed for a network launch. As machine learning models are trained with a limited set of data, implementing these changes result in performance issues (e.g., dropped calls, latency issues, network congestion, and bandwidth limitations).

In contrast to conventional solutions, in which a small corpus of data limits the ability to predict how changes (e.g., new features or services, upgrades, migrations, device configurations) within the network may affect user experience, the present disclosure is directed to systems and methods for utilizing a generative adversarial network that generates synthetic data that can be combined with actual data to train a supervised model. To do so, seed data is initially leveraged by a generator model to generate synthetic data. A discriminator is trained to classify the synthetic data. Upon determining the synthetic data meets a particular threshold, the synthetic data is aggregated with actual data and utilized by a supervised model that predicts how changes within the network may affect user experience.

In various aspects, the generator model: extracts semantic information from text embeddings of the seed data; extracts feature data from the semantic information; determines a relationship between the feature data and the semantic information; and disentangles the feature data to generate the synthetic data. In some aspects, the generator model adds noise at the generator to vary the feature data prior to each simulation cycle of the one or more simulation cycles.

Accordingly, a first aspect of the present disclosure is directed to a system for generating synthetic data in a telecommunications network. The system comprises a generator that receives seed data for a telecommunications network and generates, in one or more simulations cycles, synthetic data; a discriminator that is trained to classify the synthetic data and communicates classified data to the generator; and an evaluator that evaluates the synthetic data using evaluation metrics and combines the synthetic data with the seed data.

Another aspect of the present disclosure is directed to a method for generating synthetic data in a telecommunications network. The method comprises receiving, at a restriction module, an indication to initiate a logic flow. The method further comprises receiving, at a generator, seed data for a telecommunications network and generates, in one or more simulations cycles, synthetic data. The method also comprises classifying, at a discriminator trained to classify the synthetic data and communicating classified data to the generator. The method further comprises evaluating, at an evaluator, the synthetic data using evaluation metrics and combining the synthetic data with the seed data.

Another aspect of the present disclosure is directed to a non-transitory computer readable media having computer executable instructions stored thereon that, when executed by one or more computer processing components, cause the one or more computer processing components to perform operations for generating synthetic data in a telecommunications network. The operations comprise receiving, at a generator, seed data for a telecommunications network. The operations also comprise training the generator to: extra semantic information from text embeddings of the seed data; extract feature data from the semantic information; determine a relationship between the feature data and the semantic information; and disentangle the feature data to generate, in one or more simulation cycles, synthetic data. The operations further comprise classifying, at a discriminator trained to classify the synthetic data and communicating classified data to the generator. The operations also comprise evaluating, at an evaluator, the synthetic data using evaluation metrics and combining the synthetic data with the seed data.

Referring now to FIG. 1, a representative network environment is illustrated in which implementations of the present disclosure may be employed. Such a network environment is illustrated and designated generally as network environment 100. Network environment 100 is but one example of a suitable network environment and is not intended to suggest any limitation as to the scope of use or functionality of the invention. Neither should the network environment 100 be interpreted as having any dependency or requirement relating to any one or combination of components illustrated.

Network environment 100 represents a high level and simplified view of relevant portions of a generative adversarial network (GAN). At a high level, the network environment 100 may generally be said to comprise a discriminator 110, a generator 120, and an evaluator 130, though in some implementations, it may not be necessary for certain features to be present. Similarly, while each component is shown in the singular, it is expressly contemplated that there may be more than one of the components described. The network environment may include a number of discriminators, generators, evaluators, and the like. The network environment 200 is generally configured for generating synthetic data in a telecommunications network and may be accessible on one or more application servers or other functions, nodes, or servers not pictured in FIG. 1 so as to not obscure the focus on the present disclosure.

As mentioned, the network environment 100 comprises the discriminator 110, the generator 120, and the evaluator 130. Each of the discriminator 110, the generator 120, and the evaluator 130 is illustrated generally, and may take any number of forms, such as the computing device discussed with respect to FIG. 4 and may have any one or more components or features of the computing device 400 of FIG. 4.

In aspects, the discriminator 110 is configured to perform an adversarial task corresponding to sample synthetic data generated by the generator 120. In this way, the discriminator 110 is a machine learning model trained on training data samples 112 to classify data generated by the generator 120. As the discriminator 110 receives sample synthetic data from the generator 120, the discriminator 110 classifies the sample synthetic data as real or fake. The discriminator 110 may be trained to extract information from the synthetic data samples and utilize a probabilistic model to classify the sample synthetic data as real if a particular threshold probability is met or exceeded or as fake if the particular threshold probability is not met or exceeded.

For example, if a threshold of the probabilistic model is set to 0.5 and the output of the discriminator 110 indicates the probability is equal to or greater than 0.5, then the synthetic data is determined to be real. On the other hand, if the output of the discriminator 110 indicates the probability is less than 0.5, then the synthetic data is determined to be fake. In each scenario, feedback is provided to the generator 120 as part of a continuous feedback mechanism to tune the generator 120.

In aspects, the generator 120 is configured to generate synthetic data. Initially, the generator 120 receives seed data 122 that may be similar or identical to the training data samples 112 used to train the discriminator 110. In some aspects, the seed data 122 is real-time data corresponding a particular geographical location, feature, or service that is planned for implementation. The generator 120 performs several manipulations of the seed data in order to generate the synthetic data. Initially, the generator 120 extracts semantic information from the seed data using text embeddings. Next, the generator 120 utilizes latent code generation to identify features corresponding to the seed data (i.e., disentangles the features) and determine cause-effect relationships among the various features.

For example, assume two features include an IP address and a device, the generator 120 calculates a joint probability distribution and a correlation coefficient. If the features are correlated, the generator 120 may add noise 124 during generation of synthetic data. Continuing the example, rather than having a fixed IP address, the noise 124 causes the IP address (or other features that may be correlated) incrementally to ensure diverse data sets are generated. Each cycle, the synthetic data is communicated to the discriminator 110 so the discriminator 110 can classify the data as real or fake.

The classified data is communicated back to the generator 120 as part of the continuous feedback mechanism that tunes the generator 120.

Once the synthetic data is determined to be realistic, the generator 120 augments the seed data with the synthetic data and communicates the augmented data to the evaluator 130. Evaluator 130 utilizes evaluation metrics 132 to determine if the augmented data is realistic. If the evaluator 130 determines the augmented data is not realistic, the augmented data is discarded. If the evaluator 130 determines the augmented data is realistic, the augmented data is communicated to train a supervised model to build/launch/predict/forecast the best experience for making the corresponding changes on the network.

In aspects, the evaluator 310 identifies the statistical and the structural similarity of the augmented data using a probabilistic model (e.g., a Gaussian-based model). The evaluator 130 also determines the models utilized by the evaluator 130 and the discriminator 110 are compatible. In other words, the evaluator 130 ensures the discriminator 110 is working in tandem with the evaluator 130 so the generator 120 generates realistic augmented data. Additionally or alternatively. The evaluator 130 ensures the augmented data does not contain any information that may constitute a privacy risk.

Figure 2:
FIG. 2 illustrates a flow diagram of a method for generating synthetic data in a telecommunications network, in accordance with the present disclosure.
Figure 2:
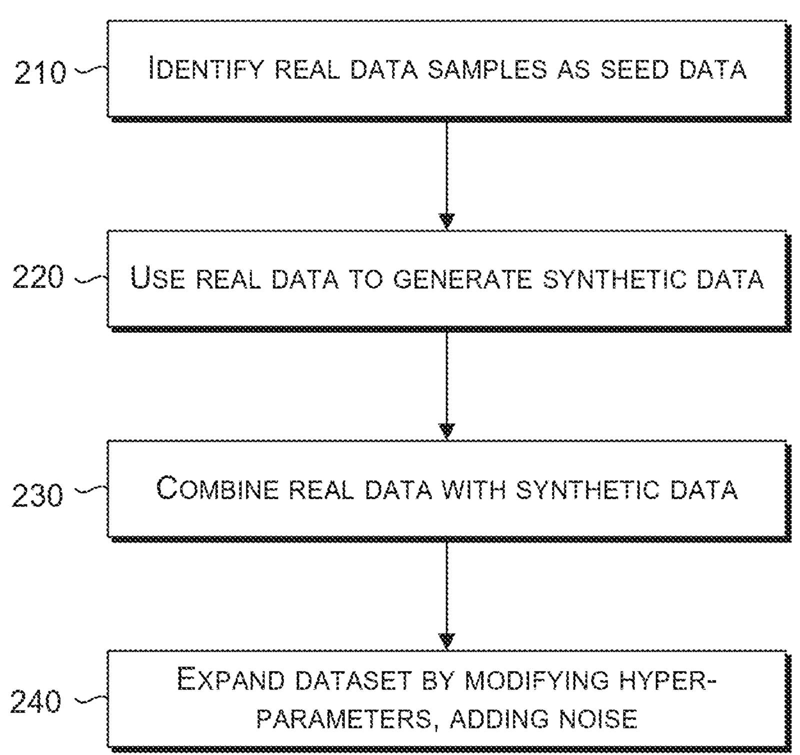

In FIG. 2, a flow diagram of a method for generating synthetic data in a telecommunications network is illustrated, in accordance with one or more aspects of the present disclosure. The method may be performed by and/or facilitated by one or more GANs discussed in greater detail herein and is not meant to exhaustively show every interaction that would be necessary to practice the invention, so as not to obscure the present disclosure. For instance, the method may be performed by a discriminator, a generator, and an evaluator (such as the discriminator 110, the generator 120, and the evaluator 130 described herein with respect to FIG. 1).

At step 210, real data samples are identified to use as seed data. In aspects, a generator receives seed data for a telecommunications network and generates, in one or more simulations cycles, synthetic data. Initially, the generator may be trained to extract semantic information from text embeddings of the seed data. The generator may also be trained to extract feature data from the semantic information. The generator may further be trained to determine a relationship between the feature data and the semantic information.

Using the relationships determined by the generator and the real data, the generator generates synthetic data, at step 220. After the synthetic data is classified and confirmed as real, the real data is combined, at step 230, with the synthetic data. The data set is expanded by modifying hyper-parameters (e.g., modifying or varying feature data), at step 240. In some aspects, the data set is further expanded by adding noise.

Figure 3:
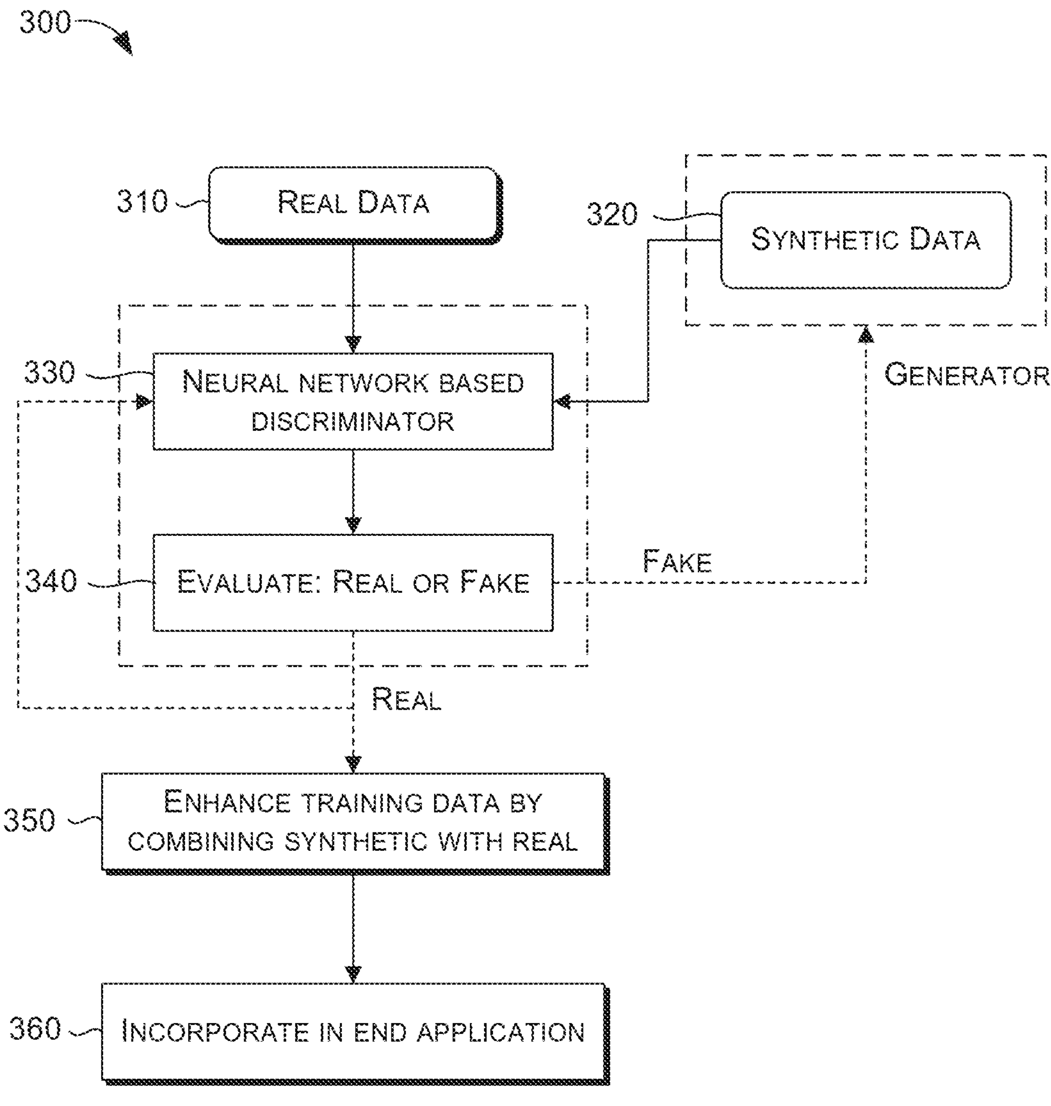
FIG. 3 illustrates a flow diagram of a method for generating synthetic data in a telecommunications network, in accordance with the present disclosure.

Turning now to FIG. 3, a flow diagram for generating synthetic data is illustrated in accordance with one or more aspects of the present disclosure. A logic flow 300 may be performed by and/or facilitated by one or more GANs discussed in greater detail herein and is not meant to exhaustively show every interaction that would be necessary to practice the invention, so as not to obscure the present disclosure. For instance, the method may be performed by a discriminator, a generator, and an evaluator (such as the discriminator 110, the generator 120, and the evaluator 130 described herein with respect to FIG. 1).

At step 310, real data is received for a telecommunications network. The real data may be received in real-time and may be relevant to a particular geographical location, feature, or service that is planned for implementation. The real data may be utilized to train a discriminator to classify synthetic data. At step 320, seed data is utilized by a generator to generate, in one or more simulations cycles, synthetic data.

At step 330, the discriminator classifies the synthetic data as real or fake. Although not shown, the discriminator communicates the classification back to the generator as part of a closed feedback loop to tune the generator to produce realistic data. In some aspects, one the data has been classified as real, the generator adds noise to vary the feature data prior to each simulation cycle of the one or more simulation cycles.

At step 340, the evaluator evaluates the synthetic data that has been classified as real. The evaluator further provides feedback to the discriminator to ensure the discriminator and the evaluator are using compatible models to classify the synthetic data. Additionally, the evaluator provides feedback to the generator if the synthetic data does not meet certain evaluation metrics. For example, the evaluation metrics may include identifying the statistical and structural similarity of the synthetic data using a probabilistic model (e.g., a Gaussian-based model). The evaluator also determines the models utilized by the evaluator and the discriminator are compatible. In other words, the evaluator ensures the discriminator is working in tandem with the evaluator so the generator generates realistic data. Additionally or alternatively, the evaluator ensures the synthetic data does not contain any information that may constitute a privacy risk.

At step 350, the data is enhanced by combining the seed data with the synthetic data. Although shown in FIG. 3 as occurring after the synthetic data is evaluated by evaluator, the data may be enhanced by generator prior to being evaluated by evaluator.

At step 360, the enhanced data is incorporated into an end application or train a supervised model to build/launch/predict/forecast the best experience for making the corresponding changes on the network.

Embodiments of the technology described herein may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media that may cause one or more computer processing components to perform particular operations or functions.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Figure 4:
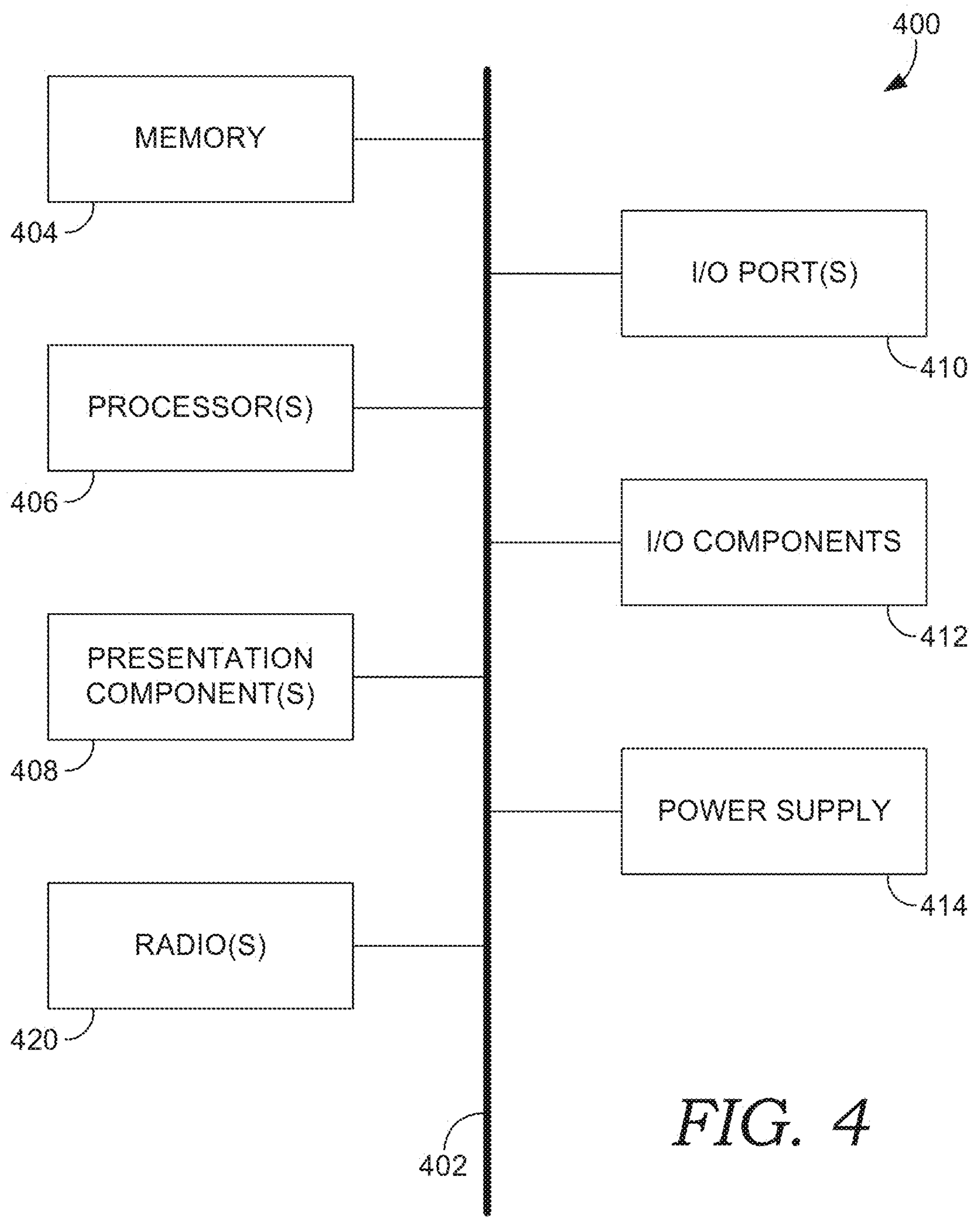
FIG. 4 illustrates an exemplary computing device for use with the present disclosure.

Referring to FIG. 4, an exemplary computer environment is shown and designated generally as computing device 400 that is suitable for use in implementations of the present disclosure. Computing device 400 is but one example of a suitable computing environment and is not intended to suggest any limitation as to the scope of use or functionality of the invention. Neither should computing device 400 be interpreted as having any dependency or requirement relating to any one or combination of components illustrated. In aspects, the computing device 400 is generally defined by its capability to transmit one or more signals to an access point and receive one or more signals from the access point (or some other access point); the computing device 400 may be referred to herein as a user equipment (UE), wireless communication device, or user device. The computing device 400 may take many forms; non-limiting examples of the computing device 400 include a fixed wireless access device, cell phone, tablet, internet of things (IOT) device, smart appliance, automotive or aircraft component, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 4, computing device 400 includes bus 402 that directly or indirectly couples the following devices: memory 404, one or more processors 406, one or more presentation components 408, one or more input/output (I/O) ports 410, one or more I/O components 412, and power supply 414. Bus 402 represents what may be one or more busses (such as an address bus, data bus, or combination thereof). Although the devices of FIG. 4 are shown with lines for the sake of clarity, in reality, delineating various components is not so clear, and metaphorically, the lines would more accurately be grey and fuzzy. For example, one may consider a presentation component such as a display device to be one of the one or more I/O components 412. Also, processors, such as the one or more processors 406, have memory. The present disclosure hereof recognizes that such is the nature of the art, and reiterates that FIG. 4 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 4 and refer to "computer" or "computing device."

Computing device 400 typically includes a variety of computer-readable media. Computer-readable media can be any available media that can be accessed by computing device 400 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media of the computing device 400 may be in the form of a dedicated solid state memory or flash memory, such as a subscriber information module (SIM). Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 404 includes computer-storage media in the form of volatile and/or nonvolatile memory. Memory 404 may be removable, nonremovable, or a combination thereof. Exemplary memory includes solid-state memory, hard drives, optical-disc drives, etc. Computing device 400 includes one or more processors 406 that read data from various entities such as the bus 402, the memory 404 or the one or more I/O components 412. The one or more presentation components 408 presents data indications to a person or other device. Exemplary one or more presentation components 408 include a display device, speaker, printing component, vibrating component, etc. The one or more I/O ports 410 allow computing device 400 to be logically coupled to other devices including the one or more I/O components 412, some of which may be built in computing device 400. Illustrative I/O components 412 include a microphone, joystick, game pad, satellite dish, scanner, printer, wireless device, etc.

The radio 420 represents one or more radios that facilitate communication with one or more wireless networks using one or more wireless links. While a single radio 420 is shown in FIG. 4, it is expressly contemplated that there may be more than one radio 420 coupled to the bus 402. In aspects, the radio 420 utilizes a transmitted to communicate with a wireless telecommunications network. It is expressly contemplated that a computing device 400 with more than one radio 420 could facilitate communication with the wireless network via both the first transmitter and additional transmitters (e.g. a second transmitter). Illustrative wireless telecommunications technologies include CDMA, GPRS, TDMA, GSM, and the like. The radio 420 may carry wireless communication functions or operations using any number of desirable wireless communication protocols, including 802.11 (Wi-Fi), WiMAX, LTE, 3G, 4G, LTE, 5G, NR, VoLTE, or other VoIP communications. As can be appreciated, in various embodiments, the radio 420 can be configured to support multiple technologies and/or multiple radios can be utilized to support multiple technologies. A wireless telecommunications network might include an array of devices, which are not shown as to obscure more relevant aspects of the invention. Components such as a base station or communications tower (as well as other components) can provide wireless connectivity in some embodiments.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the preceding detailed description is not to be taken in the limiting sense, and the scope of embodiments is defined by the appended claims and their equivalents.

What is claimed is:

1. A system for generating synthetic data in a telecommunications network, the system comprising:

a generator model implemented using a generative adversarial network (GAN), the generator model being executed by one or more processors and configured to receive seed data for a telecommunications network and to generate, in one or more simulations cycles, synthetic data;

a discriminator neural network executed by the one or more processors and trained to classify the synthetic data and to communicate classification results to the generator model to update the generator model during the one or more simulation cycles; and an evaluator executed by the one or more processors and configured to evaluate combined data comprising the seed data and the synthetic data using one or more evaluation metrics.

2. The system of claim 1, wherein the one or more evaluation metrics comprise one or more of: structural and statistical similarity, model capability, and privacy risk.

3. The system of claim 1, further comprising training the generator model to extract semantic information from text embeddings of the seed data.

4. The system of claim 3, further comprising training the generator model to extract feature data from the semantic information.

5. The system of claim 4, further comprising, determining a relationship, at the generator model, between the feature data and the semantic information.

6. The system of claim 5, further comprising disentangling, at the generator model, the feature data to generate the synthetic data.

7. The system of claim 6, further comprising, adding noise at the generator model to vary the feature data prior to each simulation cycle of the one or more simulation cycles.

8. The system of claim 1, utilizing the classified data to update the generator model.

9. A method for generating synthetic data in a telecommunications network, the method comprising:

receiving, at a generator model implemented using a generative adversarial network (GAN) and executed by one or more processors, seed data for a telecommunications network and generating, in one or more simulation cycles, synthetic data;

classifying, at a discriminator neural network executed by the one or more processors and trained to classify the synthetic data, and communicating classification results to the generator model to update the generator model during the one or more simulation cycles; and evaluating, at an evaluator executed by the one or more processors, combined data comprising the seed data and the synthetic data using one or more evaluation metrics.

10. The method of claim 9, wherein the one or more evaluation metrics comprise one or more of: structural and statistical similarity, model capability, and privacy risk.

11. The method of claim 9, further comprising training the generator model to extract semantic information from text embeddings of the seed data.

12. The method of claim 11, further comprising training the generator model to extract feature data from the semantic information.

13. The method of claim 12, further comprising, determining a relationship, at the generator model, between the feature data and the semantic information.

14. The method of claim 13, further comprising disentangling, at the generator model, the feature data to generate the synthetic data.

15. The method of claim 14, further comprising, adding noise at the generator model to vary the feature data prior to each simulation cycle of the one or more simulation cycles.

16. The method of claim 9, utilizing the classified data to update the generator model.

17. A non-transitory computer readable media having computer executable instructions stored thereon that, when executed by one or more computer processing components, cause the one or more computer processing components to perform operations for generating synthetic data in a telecommunications network:

receiving, at a generator model implemented using a generative adversarial network (GAN), seed data for a telecommunications network training the generator model to:

extract semantic information from text embeddings of the seed data;

extract feature data from the semantic information;

determine a relationship between the feature data and the semantic information; and disentangle the feature data to generate, in one or more simulation cycles, synthetic data;

classifying, at a discriminator neural network trained to classify the synthetic data and communicating classification results to the generator model to update the generator model; and evaluating, at an evaluator, combined data comprising the seed data and the synthetic data using one or more evaluation metrics.

18. The media of claim 17, wherein the one or more evaluation metrics comprise one or more of: structural and statistical similarity, model capability, and privacy risk.

19. The media of claim 17, further comprising, adding noise at the generator model to vary the feature data prior to each simulation cycle of the one or more simulation cycles.

20. The media of claim 17, further comprising utilizing the classified data to update the generator model.

* * * * *